(12) United States Patent
Samworth

(10) Patent No.: US 6,731,405 B2
(45) Date of Patent: May 4, 2004

(54) PRINTING PLATES CONTAINING INK CELLS IN BOTH SOLID AND HALFTONE AREAS

(75) Inventor: Mark Samworth, Wilmington, DE (US)

(73) Assignee: Artwork Systems, Bristol, PA (US)

( * ) Notice: Subject to any disclaimer, the term of this patent is extended or adjusted under 35 U.S.C. 154(b) by 0 days.

(21) Appl. No.: 10/067,619

(22) Filed: Feb. 4, 2002

(65) Prior Publication Data

US 2002/0083855 A1 Jul. 4, 2002

Related U.S. Application Data

(60) Continuation-in-part of application No. 09/828,385, filed on Apr. 6, 2001, which is a division of application No. 09/312,188, filed on May 14, 1999, now Pat. No. 6,213,018.

(51) Int. Cl.$^7$ .............................................. H04N 1/405
(52) U.S. Cl. ...................... 358/3.06; 358/3.12; 358/3.3; 358/2.1
(58) Field of Search ................................ 358/2.1, 3.06, 358/3.12, 3.29, 3.3; 101/395, 401; 430/306

(56) References Cited

U.S. PATENT DOCUMENTS

| | | | |
|---|---|---|---|
| 3,613,578 A | 10/1971 | Heurich | 101/352.13 |
| 3,891,443 A | 6/1975 | Halpern et al. | 101/395 |
| 3,916,096 A | 10/1975 | Everett et al. | |
| 4,152,986 A | 5/1979 | Dadowski et al. | 101/463 |
| 4,158,567 A * | 6/1979 | Honma et al. | 430/307 |
| 4,187,107 A * | 2/1980 | Homma et al. | 430/252 |
| 4,283,484 A | 8/1981 | Fairhead et al. | 101/401.1 |
| 4,554,594 A | 11/1985 | Ciardiello et al. | |
| 4,595,956 A | 6/1986 | Kawamura et al. | |
| 4,819,558 A | 4/1989 | Counard | 101/348 |
| 5,016,191 A | 5/1991 | Radochonski et al. | |
| 5,111,194 A | 5/1992 | Oneda | |
| 5,229,861 A * | 7/1993 | Nozaka et al. | 358/2.1 |
| 5,435,247 A | 7/1995 | Giori et al. | 101/401 |
| 5,659,385 A | 8/1997 | Koltz | 355/77 |
| 5,884,560 A | 3/1999 | Optiz et al. | 101/401 |
| 5,892,588 A * | 4/1999 | Samworth | 358/3.19 |
| 6,118,935 A * | 9/2000 | Samworth | 358/1.9 |
| 6,492,095 B2 * | 12/2002 | Samworth | 430/306 |

OTHER PUBLICATIONS

"Flexography Principles and Practices" 4$^{th}$ Ed. Foundation of Flexographic Technical Association, Ronkonkama, N.Y., 1992. Pp. 130–137.

* cited by examiner

Primary Examiner—Scott Rogers
(74) Attorney, Agent, or Firm—Ratnerprestia (57) ABSTRACT

A method, associated software and resulting printing plate having both solid and halftone areas comprising ink cells. Ink cells may be provided in the solid areas according to a first pattern with a first density and size of cells per unit area, and in the halftone areas superposed on selected numbers of halftone dots. The selection of halftone dots with superposed ink cells may be according to a second pattern with a second density and size of cells in the halftone area that is a function of halftone dot size and that may or may not be related to the first pattern.

9 Claims, 5 Drawing Sheets

PRINTING PLATES CONTAINING INK CELLS IN BOTH SOLID AND HALFTONE AREAS

This application is a continuation in part application of application Ser. No. 09/828,385 filed Apr. 6, 2001 which is a divisional application of U.S. Ser. No. 09/312,188 filed May 14, 1999, now U.S. Pat. No. 6,213,018 issued Apr. 10, 2001.

The entire disclosures of U.S. patent application Ser. No. 09/828,385 filed on Apr. 6, 2001 and of U.S. Pat. No. 6,213,018 are expressly incorporated by reference herein.

BACKGROUND OF THE INVENTION

1. Field of the Invention

This invention relates to printing and more particularly to flexographic printing with a plate having a plurality of ink carrying cells in the solids areas and in selected halftone areas, the method for making such plate, and software for implementation of such method.

2. Description of Related Art

Flexography is a direct rotary printing method that uses resilient-relief image plates of rubber or other resilient materials including photopolymers to print an image on diverse types of materials that are typically difficult to image with traditional offset or gravure processes, such as cardboard, plastic films and virtually any type of substrate whether absorbent or non absorbent. As such it has found great applications and market potential in the packaging industry.

Figure 1:
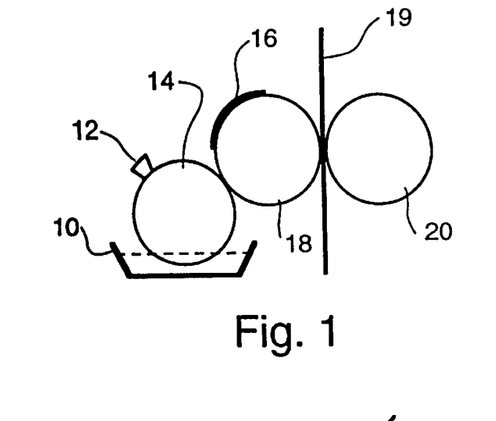
FIG. 1 shows a schematic elevation of the various basic elements of a single color flexographic printing press.

Flexographic printing plates are normally affixed onto a printing cylinder for printing. As shown in FIG. 1 an ink fountain pan 10 supplies ink to a metering roll 14. An optional doctor blade 12 may be used to wipe off excess ink from the metering roll to assist in controlling the amount of ink that is on the metering roll. The flexographic printing plates 16 are mounted on the printing cylinder 18. The material to be printed, usually supplied as a continuous web 19, is placed between the printing roll 18 and a backing roll 20. The flexographic printing plate is brought against the material typically with just sufficient pressure to allow contact between the relief image on the plate and the material printed.

Flexographic printing plates can be made of either vulcanized rubber or a variety of radiation sensitive polymer resins, typically sensitive to ultraviolet radiation. A well known such flexographic photosensitive polymer resin plate is Cyrel®, a product of E. I. DuPont de Nemours and Co. Inc. which was introduced in the mid seventies and has since found widespread acceptance by the printing industry.

Flexography printing is a printing process whereby ink is transferred through a metering roll to the relief portions of the printing plate and therefrom in a process akin to stamping from the relief plate areas to the printed surface. In order to produce good images it is essential that the ink applied to the printed surface is applied uniformly and predictably. This in turn requires that the relief areas in the flexographic plate carry ink in a uniform layer and in predictable amounts.

The prior art has attempted to solve this problem by controlling the amount of ink applied to the printing plate using a special ink metering roll which is known as an anilox roll. Anilox rolls have on their surface a plurality of ink metering cells. These cells are small indentations arrayed in regular patterns of a predetermined frequency and of uniform depth and shape. Typically they are created by engraving the cylinder face by a mechanical process or by laser. The amount of ink delivered by the anilox roll is controlled by the screen size of the cells.

In operation ink is transferred from the ink well onto the anilox metering roll 14 filling the cells. The optional wipe blade 12 wipes off excess ink from the roll surface leaving only the cells filled. The ink from the cells is then transferred onto the flexographic plate relief areas as the anilox roll and the flexographic plate rotate in contact with one another.

Flexographic printing is what may be termed a binary system. That is, it either prints or it does not. Whenever relief areas contact the printed surface, one gets a substantially solid color area. To create a gray scale, a process called half-toning is used. This is a well known process wherein gray tones are reproduced by printing a plurality of minute solid dots per unit area and varying either the frequency of the dots per unit area or the size of the dots per unit area or both.

It has been observed, and is a well known problem in flexographic printing, that solid areas, that is areas in the image where there are no half tone dots, appear to print with less saturation and somewhat less uniformity than halftone areas representing dark image areas. Thus an area with a dot coverage of 95% to 98% appears darker than a solid area (100%). Furthermore, solid flexographic image areas tend to show a "halo" around the solid area, that is, a darker border around the solid image area.

As mentioned earlier, flexography's primary application is packaging. Due to product competition, the market requirements on the printing quality of the images on the packaging are becoming very stringent. There is thus a need for flexographic printing plates that alleviate these problems and for a method preferably implemented through software, to produce such plates.

SUMMARY OF THE INVENTION

This invention alleviates the above problems through a printing plate, preferably a flexographic printing plate, comprising ink carrying cells on portions of its printing surface, said portions comprising both solid and halftone areas. The presence and size of the ink carrying cells in the halftone areas are a function of the dot sizes in the halftone areas.

Still according to this invention, the solid area comprises ink carrying cells at a first pattern and the halftone area comprises ink cells at a second pattern. The second pattern may be the same as the first pattern and the ink cell in the second pattern may be at a density per unit area that is less than the density of the ink cells produced by the first pattern in the solid areas.

In accordance with one aspect of this invention, the density of ink cell dots per unit area in the halftone areas decreases as a function of the dot size in the halftone area.

The ink carrying cells in the halftone dots are, preferably, centered in the halftone dots. Because the halftone dots are usually generated digitally in a digital environment, there is therefore also provided according to this invention, a method for generating ink carrying cells centered on digitally generated halftone dots.

It is a further object of this invention to provide a digitally imaged screened film intermediate for making the printing plate described above. The film intermediate represents an image having solid image areas and halftone image areas for use in preparing a printing plate, wherein the solid image areas reproduced on the screened film intermediate comprise a dot pattern formed by an array of a plurality of distinct dots arrayed along preselected directions said dots representing ink cells, and wherein the halftone areas also comprise ink cell dots centered on the surface of a selected number of the halftone dots. The ink cell dots in the solid areas are reproduced at a first density per unit area. The ink cell dots in the halftone areas are reproduced on the halftone dots with dimensions that are a function of the halftone dot size. The density of ink cells in the halftone area is not as high as the density of ink cells in the solids. However the ink cells in the halftone areas may be placed in an array having the same frequency and orientation as the array used in placing ink cells in the solids.

It also an object of the present invention to provide a machine readable program for use in a computer to supply an exposure device with exposure data to expose an imageable element, such program performing the steps of:

(a) reading information representing an image comprising at least one solid image area and at least one halftone image area comprising halftone dots;

(b) superposing a first ink cell pattern on said at least one solid image area;

(c) superposing a second ink cell pattern on said halftone dots of said at least one halftone area said second ink carrying cell pattern being a function of said halftone dots; and (c) generating exposure information for said exposure device to reproduce said solid image areas with said superposed first ink cell pattern and said halftone image area with said superposed second ink cell pattern.

In somewhat more detail, this invention comprises a machine readable program for generating screened bit map image data for exposing an imageable element, such program performing the steps of:

(A) receiving digital values representing image data;

(B) identifying digital values representing solid image data (C) screening said digital values representing solid image data using a first ink cell pattern comprising a first array of ink cells having a first size, to generate screened binary solid image data representing solid image data with superposed ink cells;

(D) identifying digital values representing halftone values less than a preselected digital halftone value;

(E) screening said digital values representing halftone values less than a preselected halftone value and generating screened normal halftone image data representing halftone dots;

(F) identifying digital values representing halftone values equal to and greater than said preselected halftone value;

(G) screening said digital values representing halftone values equal to and greater than said preselected halftone value using a second ink cell pattern comprising a second array of ink cells having a second ink cell size, and generating screened ink cell carrying halftone image data representing halftone areas wherein selected halftone dots comprise ink cells on a surface thereof and (H) combining said:
  (i) screened solid image data,
  (ii) screened normal halftone image data, and
  (iii) screened ink cell carrying halftone image data
to form said screened bit map image data for exposing an imageable element.

BRIEF DESCRIPTION OF THE DRAWINGS

The invention can be more fully understood from the following description thereof in connection with the accompanying drawings described as follows.

DESCRIPTION OF THE PREFERRED EMBODIMENT(S)

Throughout the following detailed description, similar reference characters refer to similar elements in all figures of the drawings. Such figures as included herein are for illustration of particular aspects of the invention and therefore are not drawn to scale.

The preparation of a flexographic printing plate is well known technology, and is described, inter alia, in a certain publication entitled "Flexography, principles and practices", $4^{th}$ edition, 1991 published by the Flexographic Technical Association Inc. Because of the popularity of photosensitive flexographic printing plates, we will often refer to such plates in the description of the present invention, with the understanding that such reference is only for the purpose of describing typical embodiments rather than to limit this invention to photopolymerizable flexographic printing plates.

In a preferred embodiment of the present invention, a flexographic plate is prepared substantially as described in pages 130 through 134 of the aforementioned publication, "Flexography, principles and practices".

The images typically reproduced by today's flexographic plates almost always include both solid image areas and a variety of gray tone areas. By solid areas we mean areas completely covered by ink having the highest density the ink can produce on a given material. By gray areas we mean image areas where the appearance of the printed image is of a density intermediate to pure white (total absence of ink) and solid. Gray areas are produced by the aforementioned well known process of half-toning, wherein a plurality of relief surface areas per unit area of progressively larger surface area are used to produce the illusion of different density printing. These relief areas are commonly referred to in the printing industry as "halftone dots".

In classic halftoning, halftone dots are produced in regular repeating patterns of X-number of dots per linear inch. These patterns are identified by the percentage coverage of a given area by the dot surface area within the given areas as 1% dots, 5% dots 95% dots 98% dots etc. A 98% dot means that 98% of a given area is occupied by the dot surface size. A 2% dot means that 2% of the same given area is occupied by the dot surface area therein.

In an alternate embodiment, typically referred to a stochastic halftoning, rather than changing the dot size, the dot size is held constant and the frequency of occurrence of the dots is increased to produce higher and higher surface area coverage. Finally, as described in my U.S. Pat. No. 5,892,588, a combination of the two techniques may be used to improve the visual appearance of the printed image.

Figure 2:
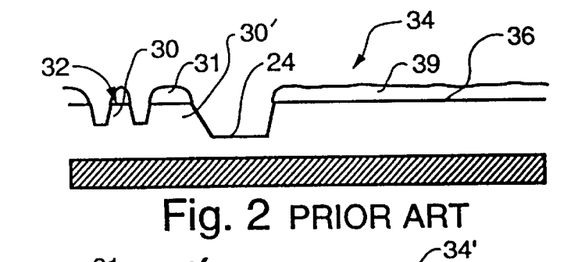
FIG. 2 shows a schematic elevation cross section of an inked flexographic printing plate solid image area according to the prior art.

In a flexographic plate, as shown in FIG. 2, these halftone dots 30 are relief areas having their surface 32 at the top surface of the plate. The plate in the area surrounding the dot 30 has been etched to a depth which except for the darkest areas reaches to a floor 24. The height of the halftone dot is the distance of the surface of the dot (and plate surface as well) to the floor. We will refer to this dot height as the halftone relief. This relief decreases as the % dot coverage increases. However this relief is sufficient to confine ink 31 to the dot surface.

Halftone relief is controlled by a number of factors, including the etching process used to remove the material from the between the dots. In a photopolymer flexographic printing plate the maximum relief is controlled by a back exposure of the plate which hardens the photopolymer to a given depth and establishes an absolute floor and thus a maximum relief.

Whether the plate is a photopolymerizable plate or an etchable plate, the halftone pattern is produced using a mask which in the photopolymerizable plate case comprises a sheet of exposed and developed photographic film. We will refer to this mask as the screened film intermediate. The screened film intermediate has a negative pattern of the dots that are to be reproduced on the plate, and in essence comprises a plurality of darkened areas representing the spacing between the dots, and a plurality of transparent areas representing the dots. This screen is placed on the plate and light is shone through the screen to expose the plate. Exposure hardens the plate in the transparent screen areas and after processing the unexposed areas are washed off leaving the relief dots behind.

As the percentage area coverage increases, the dots eventually contact and blend with each other so that after a 50% coverage is reached one no longer has isolated relief areas per dot, but instead we see isolated holes separating the dots, extending from the surface of the plate toward the floor.

As the dot coverage increases these holes become smaller and smaller and progressively less deep. The depth of the hole is dependent on the dot separation (or the diameter of the hole). Upper limits of flexographic printing plates are 98% dot coverage before plugging of the holes occurs, with 95% being a more realistic figure. This effect is used in the present invention to create a plurality of shallow ink carrying cells in the surface of solid and halftone dot areas in a flexographic plate to improve printing quality.

Figures 3, 4:
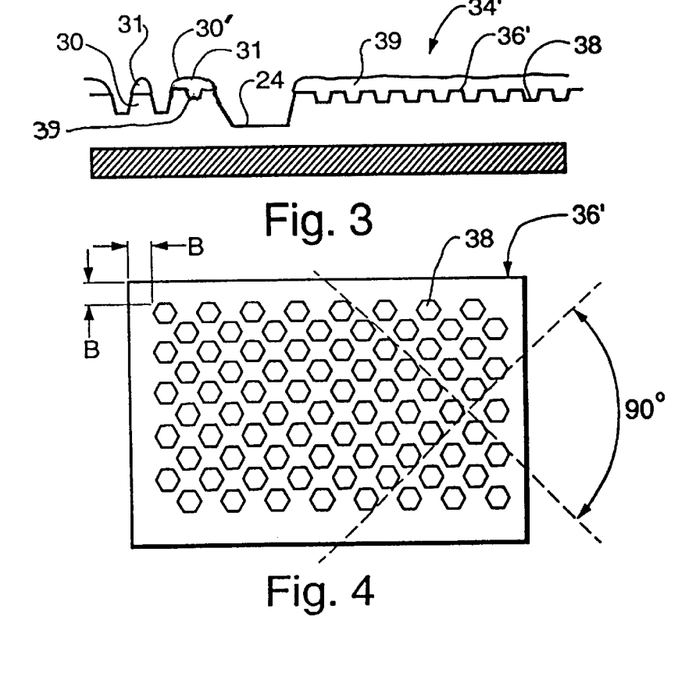
FIG. 3 shows a schematic elevation cross section of an inked flexographic printing plate solid image area according to this invention.
FIG. 4 shows a top view of an enlarged portion of the solid image area of the flexographic printing plate of FIG. 3.

It was stated earlier that a problem in printing solid areas in flexography was uneven ink transfer over the full solid area, lack of density and a halo effect along the edges of the solid area. The present invention alleviates these problems by improving the ink carrying ability of the solid areas of the flexographic printing plates by providing in that surface a plurality of ink carrying cells as shown in FIG. 3. The invention also renders halftones, particularly halftones present together with solids, by providing ink cells in selected halftone dots.

When one compares the solid area 36 of a flexographic plate 34 as shown in FIG. 2 with the same area shown in FIG. 3 one sees that the surface 36' of the plate 34' in FIG. 3 is no longer smooth but it is dotted with a plurality of ink carrying cells 38. Similarly, an ink cell 39 is shown in dot 30'. These cells do not extend to the floor 24 but are rather shallow in depth and are arrayed in a much higher frequency pattern than the halftone dots. For example the halftone dot pattern in flexographic plates is of the order of a 100 to 150 dots per inch (or lines per inch, lines per inch being a term often used in the industry) while the ink carrying cells are arrayed at frequencies of 500 to 1000 dots (or lines) per inch. Such cell frequencies are similar to the cell frequencies of the ink carrying cells found in the anilox cylinders (which also typically vary between 500 and 1000 lines per inch) and serve the same purpose as the anilox cylinders, that is to carry ink. Ink from the anilox cylinder is picked up by the flexographic plate and fills the cells as well as bridges over the cells on the solid areas. The cells appear to behave as anchor points for the ink film 39 creating an even ink distribution over the solid surface area and substantially eliminating ink accumulation or beading, usually observed along the solid image area edge. Printing of solids is thus very uniform and has good saturation and density, exceeding the saturation and density obtained by the traditional smooth solid printing surface used heretofore.

Figure 5:
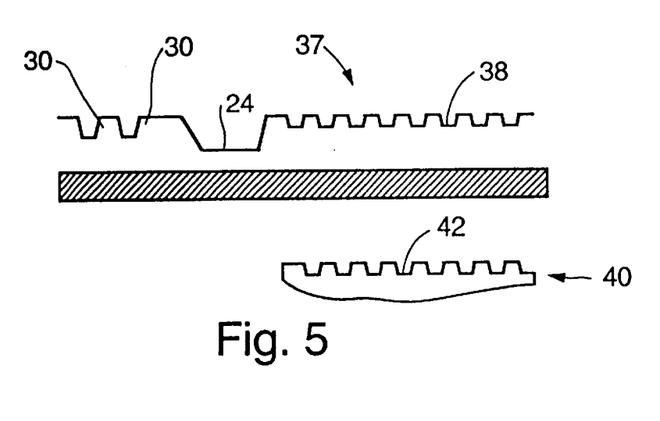
FIG. 5 shows a side by side cross section comparison of an anilox roll and a solid area of a flexographic plate.

There are a number of design parameters that must be observed if one is to obtain the best results with this invention. It is important that the plate cell ink carrying capacity per unit area be at most equal to or, preferably less than the ink carrying capacity of the anilox cylinder. If this is not observed, there may be insufficient ink transferred to the printing plate and therefrom to the printed surface, resulting in less than perfect solid density in the printed surface. To prevent such "ink starving" problem, the plate 37 ink cells 38 as shown in FIG. 5 are smaller (i.e. have less depth, or may have a smaller diameter) than the anilox metering roll 40 cells 42

Figure 6:
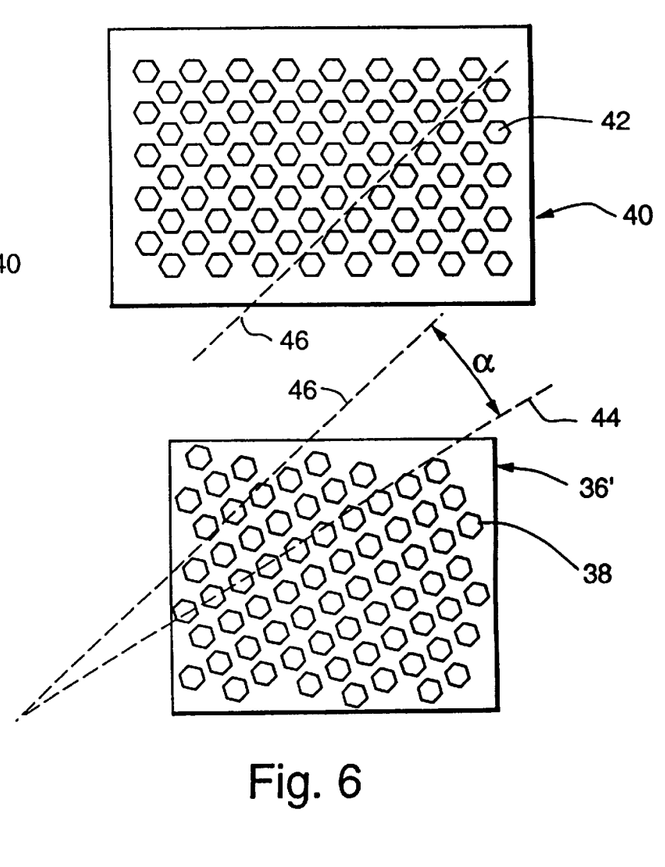
FIG. 6 shows a top view of a side by side comparison of an anilox roll surface and a flexographic printing plate and the relative orientation of the rows and columns in each.

The second important point is the nature of the distribution of the ink carrying cells. The cells in both the anilox rolls and the plate are preferably arrayed in rows and columns. In order to avoid formation of Moiré patterns from the superposition of the anilox roll cell pattern onto the plate cell pattern, it is preferred that the plate cell rows and columns form an acute angle between the anilox rows and columns respectively, as shown in FIG. 6. As shown in FIG. 6, the ink carrying cells 38 of the solid surface area 36' are arrayed in rows along a first orientation, indicated by dotted line 44. This orientation forms an angle α with the rows of the cells 42 on the anilox roll 40 which are arrayed along a second orientation, indicated by dotted line 46.

It has been the printing industry experience that an acute angle α between 15 and 45 degrees is optimum for avoiding Moiré interference patterns when using superposed halftone images with anilox rolls or with other halftone images (as in the case of multicolor printing). It has been our observation that the same principles in selecting this angle α also apply to the present invention if one is to avoid offensive artifacts in the printed image.

Therefore, in laying out the cell pattern on the plate solid areas, the relative orientation of the plate to the anilox roll must be considered and the plate patter of cells arranged such that the plate cells columns and rows are arrayed at an angle between 15 and 45 degrees relative to the anilox roll cells rows and columns respectively. A preferred value for this angle α is 30 degrees.

In addition, if four color printing is the end result, this relationship must preferably be maintained to the extent possible in all four color separation plates and all four anilox rolls, as well as between all four color separation plates alone.

To produce a flexographic printing plate according to the present invention, one must first produce a screened film intermediate of the images to be printed. This inventions also produces such film screened intermediate and includes the necessary software for the production of such film. A screened film intermediate is a binary representation of the continuous tone image in which gray scale tones have been reproduced as halftones. When multiple color printing is involved there will be usually four such film intermediates each representing a color separation as is well known in the art.

These film intermediates may be produced by traditional photographic methods or as is more likely today by a computer controlled film exposure device such as an imagesetter (laser printer) and an associated properly programmed computer.

The computer may be programmed through appropriate software to generate a halftone film negative in a manner disclosed in my aforementioned U.S. Pat. No. 5,892,588 or in any of the traditional half-toning processes well known in the art. The computer controls the laser printer and creates the half-tone dots by exposing or not exposing individual picture elements or Pixels of a tile representing the unit area in which a dot is created. A combination of a plurality of pixels is used to form dots of different areas. Again this is well known technology and is shown, inter alia, both in the aforementioned U.S. Pat. No. 5,892,588 and in numerous other publications including U.S. Pat. No. 3,916,096, Everett et al. and U.S. Pat. No. 5,016,191, Radochonski.

Regardless of the screening process selected for the half-tone process for a particular image, be it stochastic or conventional line screening, in accordance with this invention a required step is the identification of the data representing solid areas in an image This information is stored and used to control the exposure device to produce the dot pattern required to create the ink carrying cells.

The screened film is typically produced by exposing a photosensitive material to exposing radiation such as a laser beam in an imagesetter. The exposing laser beam of the imagesetter scans the identified solid areas of the film at a rate and at a pixel size sufficient to produce cells at a line frequency of between 500 and 1000 cells per inch. Typically this is done using a laser beam focussed to a pixel size of a few microns, i.e. 7 to 14 microns. A number of these pixels are combined to form an ink cell dot.

Figure 7:
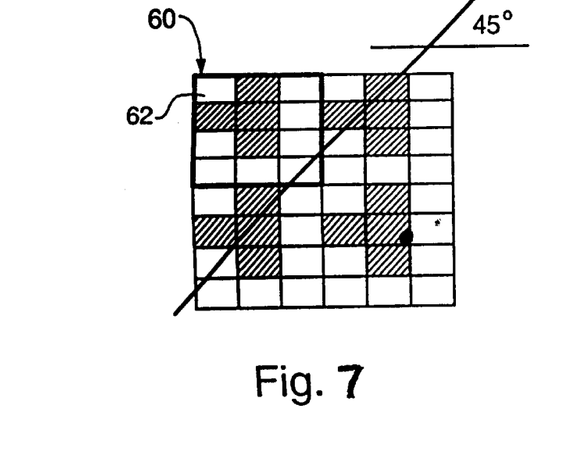
FIG. 7 shows a preferred computer generated plate ink carrying cell top view produced using a plurality of pixels.

FIG. 7 shows a portion of a screened film intermediate solid image area prepared according to this invention. The ink cell dot is produced on the film intermediate through a process called screening. Screening is a well known process in the art which results in a binary image which is used to turn the exposing laser beam ON and OFF as the laser scans the film. To make an ink cell dot, a tile 60 is first calculated. Tile 60 consists of a predetermined number of pixels 62 arrayed in two dimensions along the scanning path of the laser beam. These tiles are repeated side by side to cover the full solid area. FIG. 7 shows four such adjacent tiles.

Figure 8:
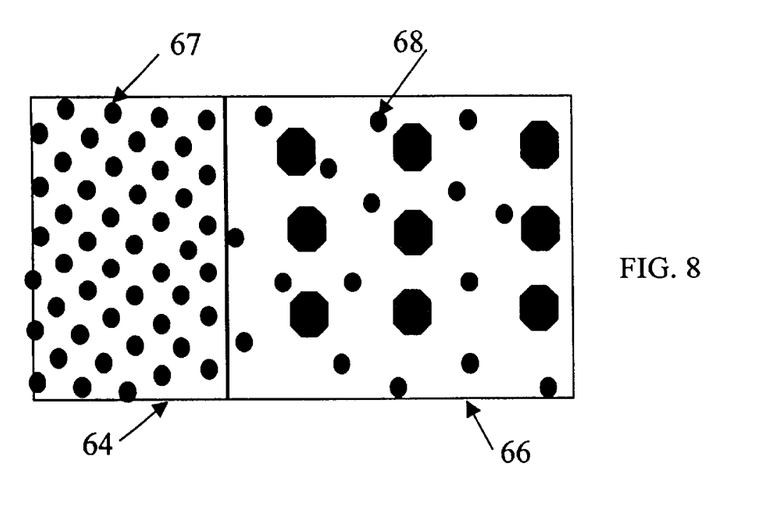
FIG. 8 shows a top view of a portion of a screen film intermediate according to an alternate embodiment of this invention wherein the ink carrying cells extend into a halftone area of the printing plate.

The ink cell dot that will be used to eventually generate an ink cell represents an exposed (darkened) area within one such tile. In FIG. 8 each tile consists of nine pixels. In calculating which of the nine pixels will be exposed by the laser beam to produce a proper ink cell dot on the film intermediate, the following requirements must be satisfied. (1) The ink cell dots must generate cells having a dimension such that their ink carrying capacity is less than the ink carrying capacity of the anilox roll cells. (2) The individual ink cells generated must not touch, or in other words there must always be plate surface area (land) between each cell and its adjacent cells. Therefore the ink cell dots on the intermediate film must also not touch, i.e. they must be distinct. (3) The cells must be arrayed along a particular frequency and at an angle depending on the anilox cell array. Therefore, the ink cell dots must also, preferably, be arrayed and the dot array orientation must be correlated with the anilox cell array orientation. (4) Finally, the resulting cell shape must resemble as much as possible a circle, and therefore the dot shape must also be chosen to resemble a circle. This last requirement is of lesser significance than the previous three.

The above conditions have been satisfied in FIG. 8 where each dot consists of nine pixels only four of which are darkened. Such arrangement provides an array that forms a 45° angle with the plate edge, and which, assuming the plate edge is parallel with the plate cylinder axis makes a 45° angle with the anilox cylinder axis. This plate cell angle would be acceptable if the anilox cell array angle makes a 15° angle with its axis as it results in a 30° angle between the plate cell array and the anilox cell array. While not shown in the figure, when a 10 micron pixel is used, the dot frequency is of the order of about 700 to 800 dots/inch. It is preferred that the screened film intermediate dot frequency be equal to or less than the ink cell frequency of the anilox roll that will be used with the plates produced using such intermediate film.

If the laser focus is 10 microns, each pixel is also 10 microns, and the resulting cell size on the plate may be estimated. The maximum diameter of the darkened ink cell dots in the screen film made using the pattern of FIG. 8 is about 30 microns. Using the rule of thumb that the depth of a hole resulting from exposing a photopolymer plate through a mask results in a hole depth ½ the maximum diameter of the dot, the resulting cell depth is about 15 microns. Thus, the ink cell dot size to be used in the intermediate film can be computed so that the resulting cells in the plate hold less ink than the anilox roll cells. The use of computer computational power permits using algorithms involving reasonably accurate approximations of the cell volume, and may be used to calculate intermediate dot shapes and sizes. The simplest approximation is of course a conical cavity having a base diameter equal to the dot max. diameter and a depth equal to ½ the diameter. In an alternate embodiment experimentation may be used to determine optimum dot shape, size and frequency for use with a particular metering roll and plate material.

We refer to a chosen ink cell dot array and ink cell dot size as a "pattern". A pattern is used to screen image areas to generate ink cells on solids or halftone areas.

The film intermediate contains markings for proper orientation and positioning of the film on the plate. These markings allow one to determine the solid image orientation relative to the printing cylinder. This, in turn, permits the array of tiled ink cell dots to be created at a particular angular orientation relative to the axis of the cylinder on which the plate is eventually mounted as mentioned above. Because the printing cylinder axis and the anilox roll axis are parallel and the relative orientation of the anilox roll cells to the anilox roll axis is known, it is possible to orient the plate ink cell dot array so that the required angle between the plate cell array and the anilox cell array is obtained.

In one embodiment of the invention, no dots are created to within one or two pixels from a solid image area edge to prevent placing ink cells on the edge of the solid area creating a scalloped edge.

According to this invention, there are also produced ink cells in selected halftone dots, such as the ink cell 39 shown in FIG. 3. Therefore, the screen film intermediate will contain areas of halftone dots as well as the areas of ink cell dots that generate the ink cells. As discussed before rather than identifying halftone dots by their actual size, we identify the halftone dots by the % dot area, as 2% dots, 5% dots, 50% dot 75% dots 90% dots etc. In a digital environment we also assign a digital value for each % dot area and identify the halftone dots by their digital values.

FIG. 8 shows a top view of a screen film intermediate having a solid area 64 and an adjacent halftone area 66. Both areas include ink cell dots. The ink cell dots extend into the halftone area but at a different pattern than the pattern used for the ink cells in the solid area. Such pattern may be completely different than the pattern used in the solids, or may be the same array pattern but with a different cell density and or cell sizes.

The cells 68 illustrated in FIG. 8 are shown as being one size. This is so because the illustrated halftone dot area 66 in FIG. 8 comprises one size halftone dots. While one size ink cells may be used, preferably the pattern used in the halftone areas includes cells having different sizes. In such case, the cell size is a function of the halftone dot size on which a cell is placed, and the placement of an ink cell on a halftone dot is also a function of the halftone dot size. In such case, the cell presence and size may be determined based on a preselected cell size selection curve such as shown in FIG. 9.

Figure 9:
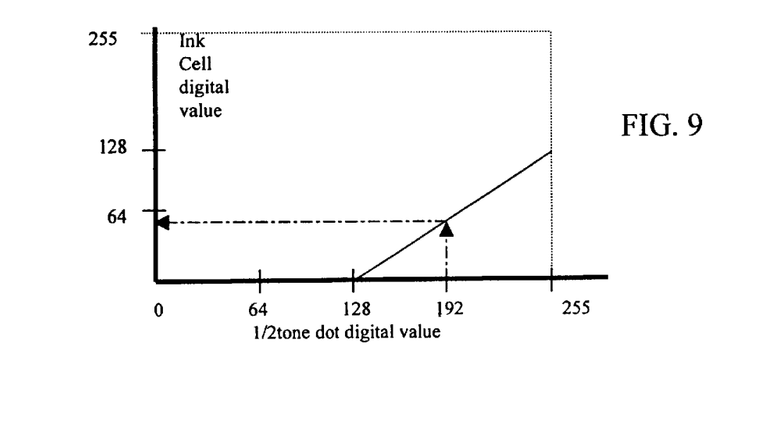
FIG. 9 shows a function representing the digital ink cell value as a function of digital dot value for use with the present invention.

As shown in FIG. 9, the "Y" axis represents a digital value for an ink cell dot. The "X" axis represents a digital value for a halftone dot. Curve "A" is a typical function representing the ink cell dot value used to generate an ink cell on a halftone dot, as a function of the halftone dot which is also represented as a digital value. A halftone dot generated from a digital value of 192 could according to this invention, and based on curve "A", have an ink cell place thereon, and the ink cell would be generated on the dot with a digital value of 64.

Curve "A" in FIG. 9, is a linear function. This is not limiting and other, non linear functions may be used in determining the ink cell sizes to be used in the halftone dots. The selection of optimum function is an experimental process involving test prints using different functions to select the best visual result. Similarly curve "A" shows a cutoff point at a 50% halftone dot (digital value 128.) This, again, is not a limitation. Other cutoff dot sizes may be selected, based on experimental results with various printing conditions. A cutoff point for ink cells indicates the dot size (digital value) where ink cells begin to be placed on the dots.

In a preferred embodiment, the pattern used to implement ink cell dots in the halftone areas provides for the gradual introduction of ink cells in a transition zone between dots that do not contain ink cells and dots that do contain ink cell dots. This may be achieved by omitting placing ink cell dots in some of the normally selected dots for placement of ink cells in the area adjacent a halftone dot area that does not contain any halftone dots with ink cells, and gradually bringing the number of omitted ink cell dots to zero as the distance from the border between the two halftone areas.

In generating the ink cell dots in the film intermediate, care must be used not to create ink cell dots that cut through the edge of a halftone dot. Preferably, the ink cell dots are centered in the halftone dots, and are smaller than the halftone dot on which they reside, to avoid creating an ink cell that extends past an edge of a halftone dot thereby creating scalloped or incomplete halftone dots.

Halftone dots, are created by exposing a number of pixels within an elementary tile comprising a plurality of pixels to form a dot in a process similar to the process described earlier for the creation of ink cell dots in the solid areas of an image. Typically halftone dots are formed using an exposure source focussed to a small spot that scans line by line a photosensitive target such as a film. The exposing source is turned ON and OFF as it scans the film exposing selected pixels on the film. The halftone dot formed may be positive or negative depending whether the intended uses is positive or negative working plate.

The determination of whether or not to expose a pixel within a tile, is done by software which controls the exposure source. The software receives digital values representing point by point a continuous tone original image. In an 8 bit system, these values range from 0–255, with white being at one end of the scale and black at the other. Depending on whether the system is a negative or a positive working system, 0 or 255 represent a fully inked or solid area. We will assume in this discussion that solids are represented by the digital value 255.

The software next screens the image, that is generates a new image in which the 8 bit digital values have been converted to binary (on-off) data that is fed to an imagesetter to control the exposing beam on or off in a way to form the solids and the appropriate halftone dots (Screening). To form a solid area, the exposing source is ON all the time it is scanning the solid area. A halftone dot is created within an elementary "tile" consisting of a plurality of pixels usually representing the minimum spot size of the exposing source. A plurality of adjacent tiles form an image area. The source is then used to "paint" a dot shape by exposing preselected pixels with each tile as the source scans the full image area, creating each dot within each tile. The dot size corresponds to the digital value for each point on the image area.

As previously mentioned, this technology is well known and there are a number of software programs that are available from different software producers that, given a digital value, produce desirable dot shapes of the proper size. The most common shape is one that approximates a circle.

Figure 10:
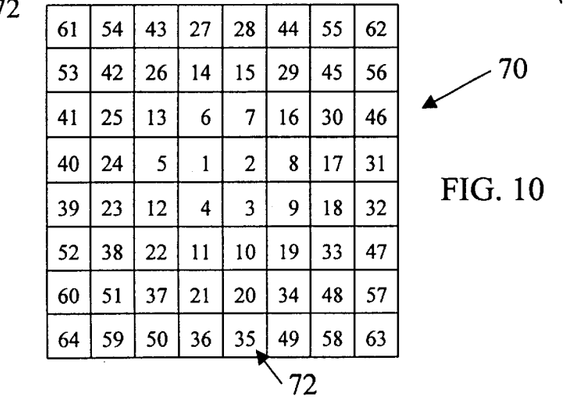
FIG. 10 shows a exemplary tile used by a programmed computer to generate a digital halftone dot in a film screen intermediate.

FIG. 10 shows an exemplary tile 70 used to generate a halftone dot using an imagesetter controlled by an appropriately programmed computer. While in practice such tiles typically comprise an array of 16×16 pixels which are exposed by a scanning laser beam, this example shows an 8×8 pixel array for simplicity. Each of the pixels 70 in the tile is identified by a digital address which, in the 16×16 array varies from 1 to 256, and which in this example corresponds to addresses from 1 to 64. To generate a halftone dot, the exposure source, i.e. a scanning laser exposes a number of pixels within a tile. This number is related to the % halftone dot called for in that area of the plate. When all pixels within a tile are exposed, the area represents a solid area. (100%) When one half of the pixels is exposed, the resulting dot represents a 50% dot.

Figure 11:
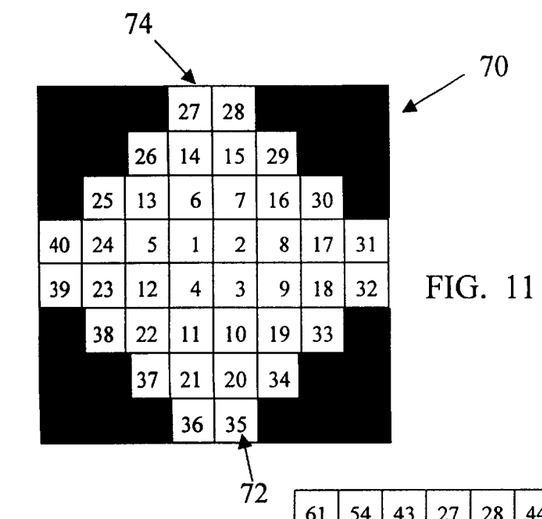
FIG. 11 shows a top view of a computer generated halftone dot in a film screen intermediate using the exemplary tile shown in FIG. 10 in accordance with prior art.

FIG. 11 shows a halftone dot generated in the tile shown in FIG. 11. This is a halftone dot corresponding to a Grey level 62.5%. The corresponding digital value for a 62.5% gray level in this example is 40. In this example, the tile 70 is selected to produce dots that are substantially round. Given the digital value input 40, the exposure source exposes all pixels within the tile with tile locations above 40. The resulting halftone dot 74 formed by the unexposed pixels 1–40 is shown in FIG. 11. In this example, to produce a solid dot in the printing plate, the film must be transparent in the area of the dot. Therefore the film intermediate dot is unexposed by the imaging laser scanning the film in the imagesetter.

The software selected to generate this particular dot shape used in the above illustration forms a generally round dot by turning ON all pixels having a digital address above a certain value. Typically in an 8 bit system the tile size would be 16×16 pixels so that there is a one to one correspondence between pixel address and halftone dot digital value. However this is not essential and there exist numerous ways that extrapolate or interpolate pixel address values in cases where there is not a one to one relationship.

Figure 12:
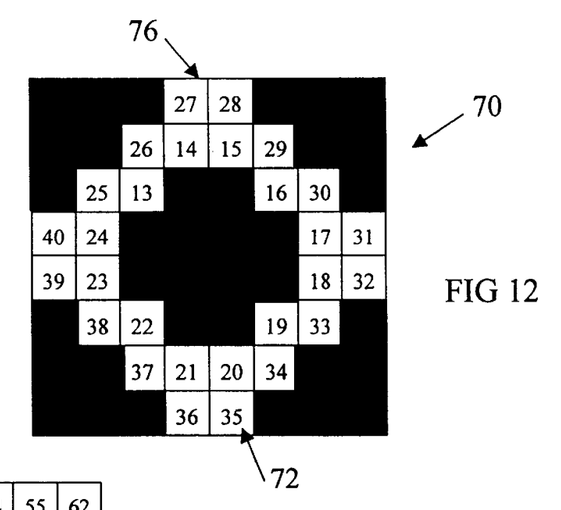
FIG. 12 shows a top view of the same computer generated halftone dot shown in FIG. 11 with an ink cell dot thereon in accordance with this invention.
Figure 13:
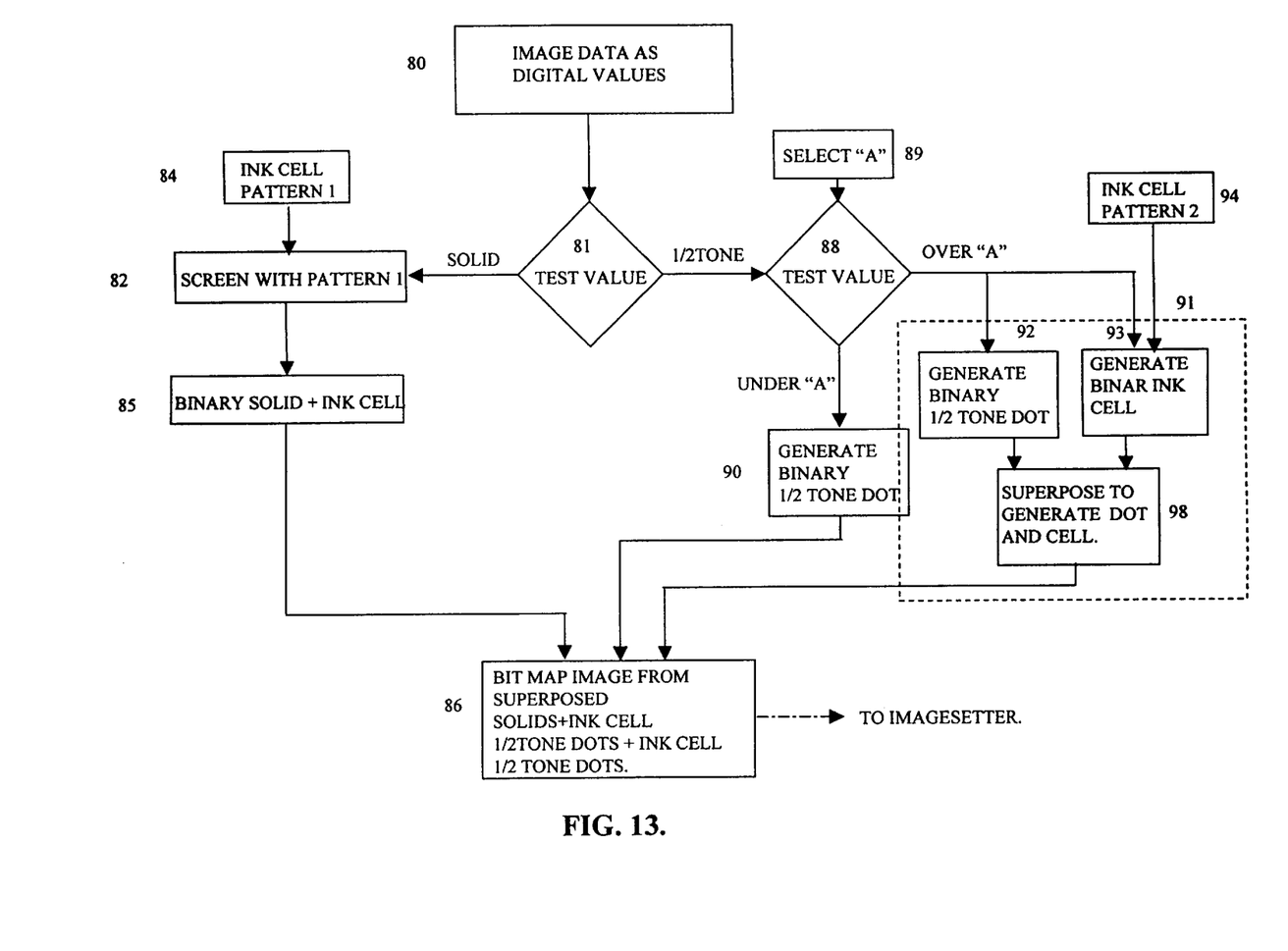
FIG. 13 shows a flow diagram for software useful in practicing the method of this invention.

According to this invention, instead of only exposing all pixels with addresses above 40, in this illustration, the software controlling the exposing laser beam also turns the laser beam ON for pixels having an address below a preselected number, i.e. 13. As a result, the dot formed on the film intermediate is no longer a solid dot, as shown in FIG. 12, but a ring shaped dot 76, with the exposed center 78 of the ring forming the ink cell dot, as shown in FIG. 13. The number 13, which represents the ink cell size as a digital value, may be arbitrarily set and fixed for all size dots above a preselected digital value, or, preferably, may be variable, derived using a curve such as curve "A" in FIG. 10 to provide an ink cell digital value that is dependent on the halftone dot size.

Because dot generating software typically forms halftone dots substantially centered in the tile, the above approach automatically forms the ink cell dot substantially in the center of the halftone dot. However, the same principle of exposing pixels in a tile based on their address to form the halftone dots containing ink cell dots can be used to place ink cell dots within halftone dots other than substantially circular and/or centered halftone dots, or ink cell dots not centered in the halftone dot The software according to the present invention may further provide an array for the ink cells placed on the halftones which may or may not be the same as the array provided for the ink cells in the solids. This may be done by placing ink cells of either fixed or variable size on selected halftone dots rather than each and every dot able to support an ink cell.

Depending on the halftone dot size, more than one ink cells may be placed thereon. In such case, the ink cell dots placed within the halftone dot during the creation of the screen film intermediate may be centered around the dot center by appropriately selecting more than one range of pixels that are turned on by the software controlling the exposure device.

Neither is it necessary that the manner by which the halftone dot generating software be known. Cells may be placed within a halftone dot by using the same software both for the halftone dot creation and for the ink cell, and by excluding the ink cell addresses from the halftone dot addresses by subtracting all ink cell addresses from the halftone addresses and then using the addresses left over to form the halftone dot on the film intermediate. In the present illustration, assuming that the halftone dot screening process calls for forming a transparent dot having a digital value 40, meaning that only pixels above 40 are exposed, and forming an ink cell having a digital value 13, meaning that all pixels under a value 13 should be exposed, the screening of the halftone dot with the superposed ink cell is formed by not exposing all pixels with addresses between 40 and 13.

Once formed, the screened film intermediate is next placed on a photopolymerizable plate such as a Cyrel® photosensitive polymer printing plate and the plate is exposed through the screen film intermediate to UV radiation. The polymer material under the film dots representing the cells remains unpolymerized. Light leakage around the exposed dot areas limits the depth of unpolymerized material to a depth which is approximately ½ of the maximum width of the light blocking dot on the screened film intermediate.

Following exposure the plate is processed in a developer which washes off the unpolymerized areas in the plate. As a result when processing is finished the plate surface bears in the solid image areas a plurality of shallow ink carrying cells having a typical depth of about 15 microns. Similarly, a number of halftone dots in the selected % dot sizes, similarly bear on their surface shallow ink carrying cells. In one embodiment these cells are centered in the halftone dots. The depth of the ink cells in the half tone dots is controlled in the same manner as the depth of the ink cells in the solids. On the other hand, the halftone dots themselves, are processed to a depth which ideally approaches the plate floor. The halftone dot relief in every case is enough so that upon inking of the plate with the anilox roll, only the top surface area of the halftone dot and the ink cell, where there are ink cells, retain ink.

The plates thus formed are aligned and mounted on the printing cylinder and the cylinder is mounted on the press. Printing proceeds in the usual manner.

Both solid and halftone areas in printed images that were printed with plates produced according to this invention exhibit higher density, better color uniformity and a reduction in halo around the edges of solids, than plates printed with the traditional smooth (no ink cells) area surface.

The advent of computers and their wide acceptance in the printing industry, make it easy to implement the above described process with a software program for use with a computer. FIG. 14 shows a typical flow diagram of the steps that such software should provide to implement this process.

First the software receives image data as a plurality of digital values for each point of the image. (Block 80). Prior to the screening process, each digital value is tested a first time. (Block 81) If the value represents a solid, i.e. 255 (8 bit 0–255 system) it is screened (82) using a first ink cell pattern (84) which has been stored in the computer memory. It is then converted to binary "solid plus ink cell" information (85) and stored superposed with other image information to form the binary imagesetter exposure data (86) that is fed to the imagesetter.

If the tested value in block 81 is 254 and less, it represents a halftone, and it is tested a second time in block 88. Block 88 tests the digital value to determine if it is equal to or above a preset value "A" (Block 89) which has been entered to identify the minimum dot size that may include an ink cell.

If the value is below "A", it is screened (90) to produce a binary representation of a normal dot (one without an ink cell) and the resulting data is also added to the exposure data in block 86

If the tested value equals or exceeds "A" the value is again screened (91). This time, however, the screening process includes screening to produce halftone dots that may include an ink cell. This, for example, may be done by (a) producing a "normal" dot (92) (b) retrieving from memory a second ink cell pattern (94) which is also "screened" (95) to produce an ink cell whose presence on an individual halftone dot and whose size are a function of the second ink cell patter, and (c) combining the ink cell and the "normal" dot to produce the binary, screened ink cell carrying halftone dot data (98) This data is also combined with the other imagesetter exposure data (86) to complete the bit map image data used to drive the imagesetter.

Using this bit map data the computer thus programmed provides the proper information to control an imagesetter to produce a film screen intermediate or to expose a printing plate either directly or through an integral mask.

Such computer program when used to form a screened film intermediate, as a minimum, performs the following operations.

(A) Store and/or retrieve imaging information representing an image including a solid and a halftone area in a memory.

(B) Supply information to an imagesetter for exposing a photosensitive material such as photographic film to produce an imaged screened film intermediate having areas representing the solid and halftone image areas, wherein:

(i) In the solid image areas, such information forms a first ink cell dot pattern comprising a plurality of pixels, wherein said dot pattern may form an array of a plurality of distinct ink cell dots arrayed along preselected directions.

(ii) In the halftone areas, such information forms selected halftone dots comprising ink cell dots which may be centered in the halftone dots.

In a preferred embodiment, the program has the additional capabilities of:

(a) Obtaining the orientation of a an array of ink carrying cells on an ink metering roll, such as an anilox roll.

(b) Computing the position of the solid image area when the flexographic plate using the screened film intermediate is placed in a position for applying ink thereon through the metering roll; and (c) calculating the orientation of the array of the plurality of distinct ink cell dots on the solid image areas on the screened film intermediate so that it forms on the printing plate an array of ink carrying cells on the solid image area oriented at an acute angle relative to the metering roll ink carrying cell array, when the intermediate film is used to produce the plate.

Furthermore, the software may include the ability to eliminate the use of a screened film intermediate by the creation of such an intermediate as a virtual intermediate in a computer. Such software may then be used to control directly either a laser platemaker or a mechanical engraving device to produce directly a printing plate comprising solid areas having ink cells thereon together with halftone areas also having ink cells on the halftone dot surface.

The above examples describe a process wherein both the halftones and the ink cell dots are aligned along a regular array having two orthogonal axes and wherein gray scales are reproduced by a change in the halftone dot size. However the ink cell dots both in the solid areas and in the halftone areas may be ink cell dots created using the stochastic halftoning method discussed above. Such method is also included within this invention, as is a combination of stochastic and classic methods for generating the ink cells. For instance the classic method may be used in the solid areas and the stochastic in the halftone areas and vice versa. Similarly, ink cells may be placed on halftone dots created using the stochastic process.

The previous description refers to a process for making a photopolymerizable plate using a screened film half-tone negative. Such negatives may also be used with a non photopolymer plate, through the use of an intermediate photomask over an etchable plate as is well known in the art. In such case the photomask serves as the film intermediate described herein. In certain applications rather than making a separate screened film, a photosensitive coating is placed directly on the plate as a top layer. This layer may then be imaged in the same manner as the screened film and subsequently used as the photomask for exposing and processing the flexographic plate.

These modifications are to be construed as being encompassed within the scope of the present invention as set forth in the appended claims wherein I claim:

1. A machine readable program for use in a computer to supply an exposure device with exposure data to expose an imageable element, such program performing the steps of:

(a) obtaining information representing an image comprising at least one solid image area and at least one halftone image area comprising halftone dots;

(b) superposing a first ink cell pattern on said at least one solid image area, said pattern comprising solids ink cells having a size;

(c) superposing a second ink cell pattern on said halftone dots of said at least one halftone area said second ink cell pattern comprising halftone ink cells having a size, said second pattern being a function of said halftone dots; and (c) generating exposure information for said exposure device to reproduce said solid image areas with said superposed first ink cell pattern and said halftone image area with said superposed second ink cell pattern.

2. The machine readable program according to claim 1 wherein said halftone dots also have a size, and wherein said superposed halftone ink cell size on said halftone dots is a function of said halftone dot size.

3. The machine readable program according to claim 2 wherein there are at least two adjacent halftone areas, a first having halftone dots a number of said first area halftone dots comprising superposed ink cells according to said second pattern, and a second having halftone dots without superposed ink cells and wherein the number of said first area halftone dots comprising superposed ink cells according to said second pattern is also a function of distance from an interface between said first and said second halftone dot areas.

4. The machine readable program according to claim 1 wherein said first ink cell pattern has a first ink cell density and said second ink cell pattern has a second halftone ink cell density and wherein said second density is less than said first density.

5. A machine readable program for generating screened bit map image data for exposing an imageable element, such program performing the steps of:

(A) receiving digital values representing image data;

(B) identifying digital values representing solid image data (C) screening said digital values representing solid image data using a first ink cell pattern to generate screened binary solid image data representing solid image data with superposed ink cells;

(D) identifying digital values representing halftone values lower than a preselected halftone value;

(E) screening said digital values representing halftone values lower than a preselected halftone value and generating screened normal halftone image data representing halftone areas under said preselected halftone value;

(F) identifying digital values representing halftone values equal to and higher than said preselected halftone value;

(G) screening said digital values representing halftone values equal to and higher than said preselected halftone value using a second ink cell pattern and generating screened ink cell carrying halftone image data representing halftone areas wherein selected halftone dots corresponding to said digital values equal to or higher than said preselected halftone value comprise ink cells on a surface thereof; and (H) combining said:
(i) screened solid image data,
(ii) screened normal halftone image data, and
(iii) screened ink cell carrying halftone image data into said screened bit map image data for exposing an imageable element.

6. The machine readable program according to claim 5 wherein the step of screening said digital values representing halftone values equal to and higher than said preselected halftone value using a second ink cell pattern and generating screened ink cell carrying halftone image data representing halftone areas wherein selected halftone dots corresponding to said digital values equal to or higher than said preselected halftone value comprise ink cells on a surface thereof comprises:

(1). storing said second ink cell pattern;

(2). for each halftone digital value representing an individual halftone dot, determining if said second pattern requires an ink cell on said individual halftone dot and if it does (3). screening said halftone dot and said ink cell and combining said screened dot and said screened ink cell to form said screened ink cell carrying halftone image data.

7. The machine readable program according to claim 6 wherein said second ink cell pattern comprises a function representing ink cell digital values as a function of halftone dot digital values and said ink cell required on said individual halftone dot has a size determined from said stored function.

8. The machine readable program according to claim 6 wherein the step of screening said halftone dot and said ink cell and combining said screened ink cell with said screened halftone dot is performed in a single step.

9. The machine readable program according to claim 6 wherein the step of screening said halftone dot and said ink cell and combining said screened ink cell with said screened halftone dot further comprises:

(a) generating a pixel tile representing a plurality of addressable pixels arrayed in a way that addressing all pixels under a selected address value generates a screened halftone and wherein said pixel address values correspond to said digital image values such that a screened halftone dot for a certain digital image value is generated by all pixels having an address value under said digital image value;

(b) determining what pixels form said screened halftone dot for said certain digital image value and determining what pixels form said screened ink cell; and (c) screening said halftone dot with said ink cell thereon with only those pixels remaining after excluding the pixels for said screened ink cell from the pixels for said screened halftone dot.

* * * * *